United States Patent
Shao

(10) Patent No.: US 9,483,112 B2
(45) Date of Patent: Nov. 1, 2016

(54) EYE TRACKING IN REMOTE DESKTOP CLIENT

(71) Applicant: VMware, Inc., Palo Alto, CA (US)

(72) Inventor: Wenlong Shao, Beijing (CN)

(73) Assignee: VMware, Inc., Palo Alto, CA (US)

( * ) Notice: Subject to any disclaimer, the term of this patent is extended or adjusted under 35 U.S.C. 154(b) by 421 days.

(21) Appl. No.: 14/037,377

(22) Filed: Sep. 26, 2013

(65) Prior Publication Data

US 2015/0089381 A1   Mar. 26, 2015

(51) Int. Cl.
| | | |
|---|---|---|
| *G06F 3/01* | (2006.01) | |
| *G06F 3/0481* | (2013.01) | |
| *G06F 9/44* | (2006.01) | |
| *G06F 1/16* | (2006.01) | |
| *G06F 3/0485* | (2013.01) | |

(52) U.S. Cl.
CPC ............ *G06F 3/013* (2013.01); *G06F 1/1686* (2013.01); *G06F 3/0485* (2013.01); *G06F 3/04817* (2013.01); *G06F 9/4445* (2013.01); *G06F 2203/04806* (2013.01)

(58) Field of Classification Search
CPC ................ G06F 3/013; G06F 9/4445; G06F 3/0485–3/04855
See application file for complete search history.

(56) References Cited

U.S. PATENT DOCUMENTS

| | | | | |
|---|---|---|---|---|
| 2006/0061544 | A1* | 3/2006 | Min | G02B 27/0093 345/156 |
| 2010/0100853 | A1* | 4/2010 | Ciudad | G06F 3/012 715/856 |
| 2012/0272179 | A1* | 10/2012 | Stafford | G06F 3/012 715/781 |
| 2012/0326945 | A1* | 12/2012 | Ellis | G06F 3/1423 345/1.1 |
| 2013/0219012 | A1* | 8/2013 | Suresh | G09G 5/14 709/217 |

* cited by examiner

*Primary Examiner* — Eric Wiener

(57) ABSTRACT

A remote desktop client application on a client device receives screen data from a remote desktop on a remote server and displays a portion of the remote desktop, a mode icon, and direction icons. In a first mode, the remote desktop client detects a direction icon being selected by the user's eye movements and locally scrolls the remote desktop to display another portion of the remote desktop. The remote desktop switches to a second mode after detecting the mode icon being selected based on the user's eye movements. In the second mode, the remote desktop client detecting a direction icon being selected by the user's eye movements and sends a scrolling command to remotely scroll in the remote desktop. The remote desktop client receives updated screen data of the remote desktop from the remote server and displays the other portion of the remote desktop based on the updated screen data.

20 Claims, 5 Drawing Sheets

EYE TRACKING IN REMOTE DESKTOP CLIENT

BACKGROUND

In a typical virtual desktop infrastructure (VDI) architecture, displays and input devices are local, and applications execute remotely in a server. A user's desktop is typically hosted in a datacenter or cloud, and the user remotely interacts with her desktop via a variety of endpoint devices, including desktops, laptops, thin clients, smart phones, and tablets.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are therefore not to be considered limiting of the scope of the disclosure. The disclosure will be described with additional specificity and detail through use of the accompanying drawings.

In the drawings.

DETAILED DESCRIPTION

A user may use a remote desktop client on a smart phone or tablet computer to connect to a remote desktop of a virtual machine (VM) on a remote server and run Windows applications. However, Windows applications may not be designed to display properly on the small screen of the smart phone or tablet computer. To use the Windows applications, the user may have to frequently pinch in and out. For example, the user may zoom in to read a document and click the correct buttons on an application, and then the user may zoom out to see the entire application window or remote desktop.

In examples of the present disclosure, a method is provided for a remote desktop client application on a client device to locally display a remote desktop located on a remote server based on a user's eye movements. The remote desktop client application connects to the remote desktop on the remote server and receives screen data of the remote desktop from the remote server. The remote desktop client application displays a portion of the remote desktop based on the screen data, a mode icon, and direction icons. Operating in a first mode for the direction icons, the remote desktop client application detects one of the direction icons being selected based on the user's eye movements and, in response, scrolls the remote desktop to display another portion of the remote desktop.

The client device may include one or more front-facing cameras to capture images of the user's face, including the eyes. The client device may also include eye tracking software to identify the eyes and track the user's eye movements (i.e., user's gaze) to determine what the user is looking at on the display screen. For example, the user's pupils may be mapped to a location on the display screen so the client device may determine the portion of the screen that the user is looking at.

The remote desktop switches from the first mode to a second mode for the direction icons when the remote desktop client detects the mode icon being selected based on the user's eye movements. In the second mode, the remote desktop client application detects one of the direction icons being selected based on the user's eye movements and, in response, sends a scrolling command to the remote desktop on the remote server (such as to scroll a window pane). The remote desktop client application receives updated screen data of the remote desktop from the remote server and displays the other portion of the remote desktop based on the updated screen data.

Figure 1:
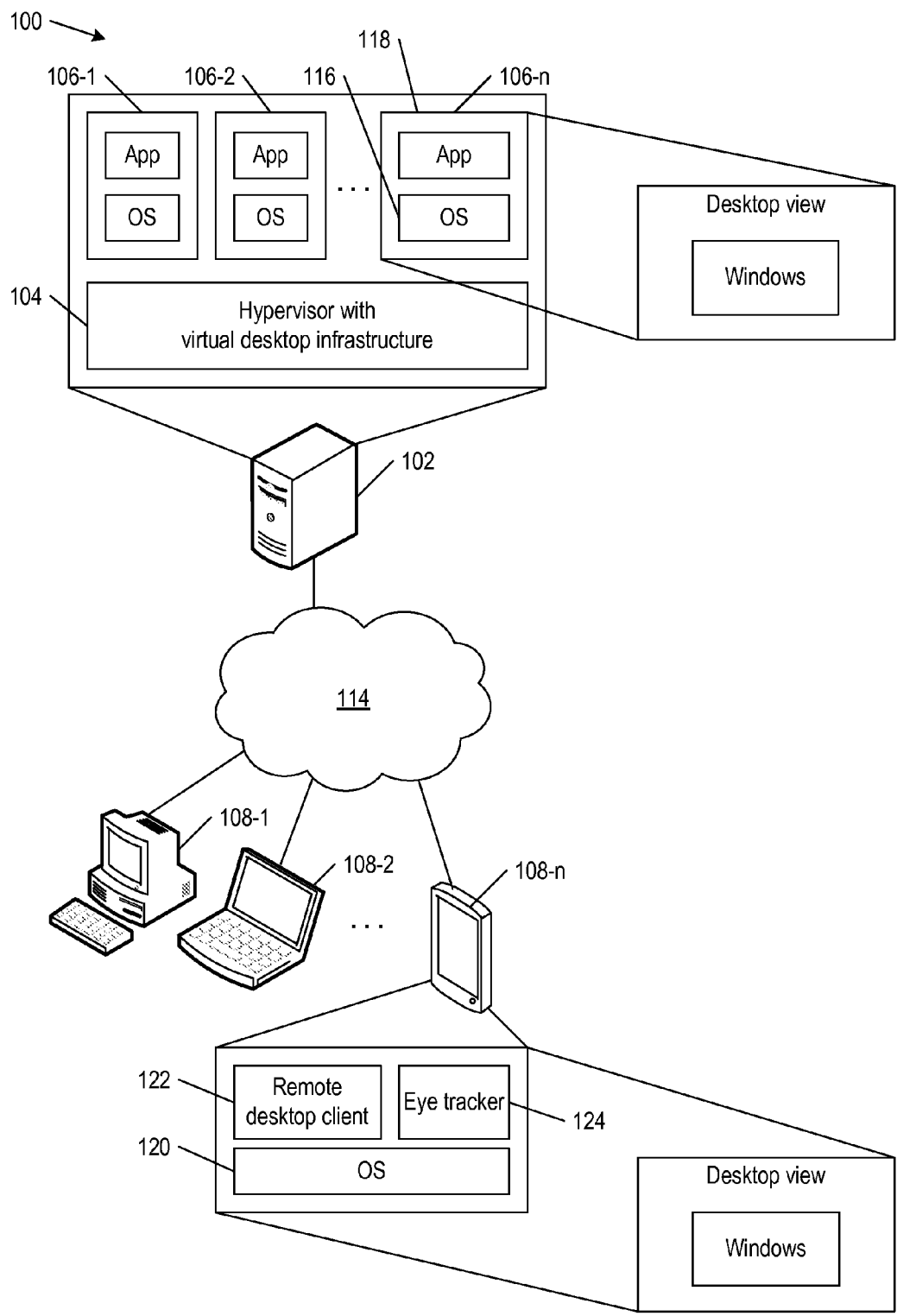
FIG. 1 is a block diagram illustrating a simplified view of a remote desktop system in examples of the present disclosure.

FIG. 1 is a block diagram illustrating a simplified view of a remote desktop system 100 in examples of the present disclosure. System 100 includes at least one server computer 102 that provides virtual desktop services to remote users. Server computer 102 runs a hypervisor 104 with virtual desktop infrastructure (VDI) that manages the assignment of VMs 106-1, 106-2 . . . 106-n (collectively as "VMs 106") to remote users. The remote users use client devices 108-1, 108-2 . . . 108-n (collectively as "client devices 108") to access remote desktops on VMs 106. Client devices 108 may be laptops, desktops, tablet computers, and smart phones. Client devices 108 provide display presentation and input/output capabilities associated with VMs 106. Client devices 108 communicate with server 102 via a network 114. VMs 106 communicate with corresponding clients using a remote display protocol. The remote display protocol may be any display remoting protocol, such as PC-over-IP (PCoIP), available from Teradici, Corp., Remote Desktop Protocol (RDP) available from Microsoft, or Blast, an HTML-based display remoting protocol available from VMware, Inc.

VM 106-n includes memory and processor that executes a guest operating system (OS) 116 and an application 118. A mobile client 108-n includes memory and processor that executes an OS 120, a remote desktop client application 122, and an eye tracker application 124, and one or more front-facing cameras. Remote desktop client application 122 connects to the remote desktop of VM 106-n and receives screen data of the remote desktop. The screen data may compose the entire remote desktop. As mobile client 108-n has a small display, remote desktop client application 122 locally displays a portion of the remote desktop. Using the front-facing cameras on client device 108-n, eye tracker 124 tracks a user's eye movements and provides coordinates of where the user is looking as inputs to remote desktop client application 122. Based on the user's eye movements, remote desktop client application 122 locally scrolls the remote desktop to view another portion of the remote desktop or scrolls remotely in the remote desktop.

Figure 2:
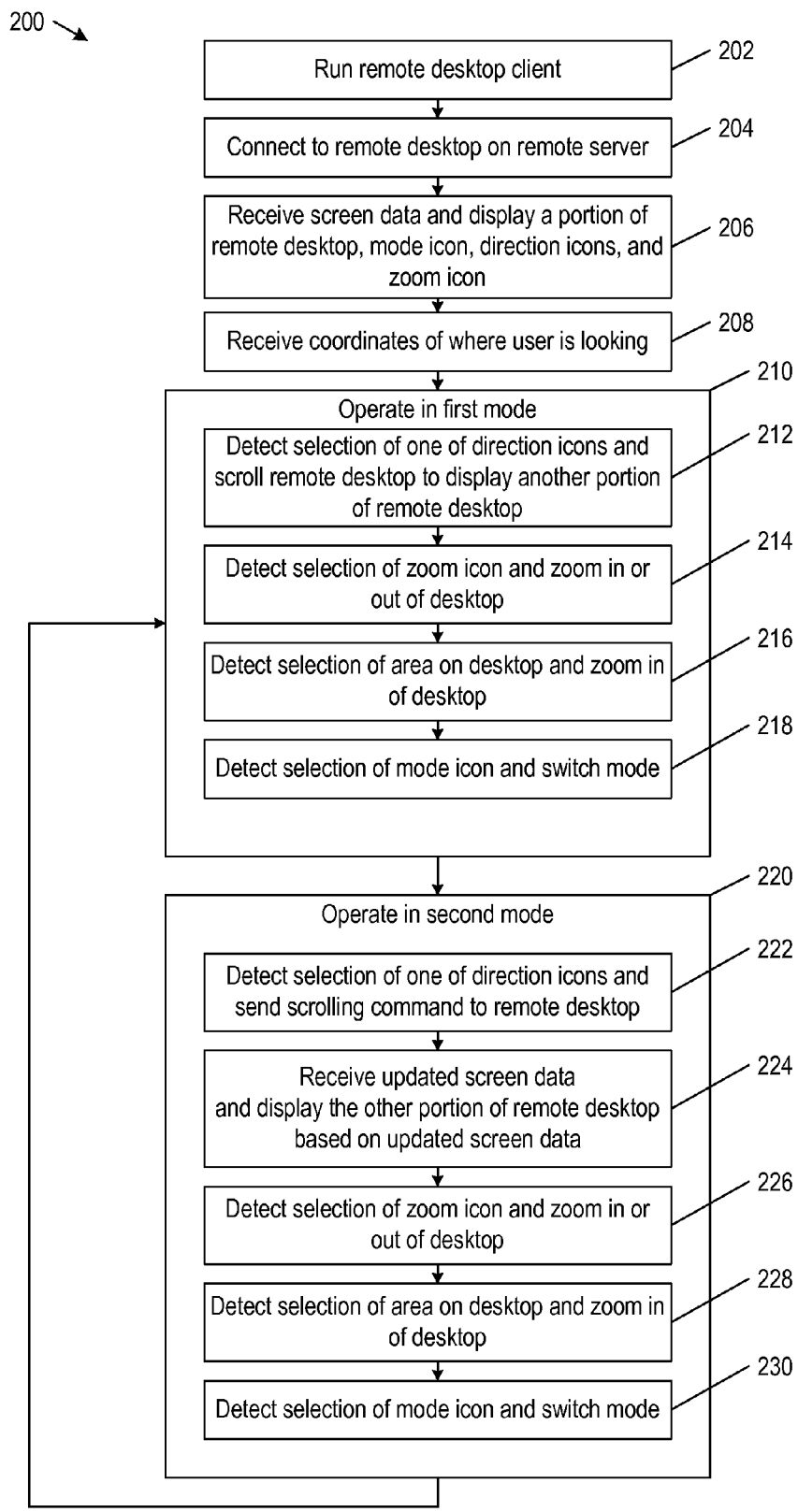
FIG. 2 is a flowchart of a method for a remote desktop client of FIG. 1 to locally display a remote desktop based on the user's eye movements in examples of the present disclosure.

FIG. 2 is a flowchart of a method 200 for remote desktop client application 122 (FIG. 1) to locally display a remote desktop based on the user's eye movements in examples of the present disclosure. Method 200 may begin in block 202.

In block 202, remote desktop client application 122 is executed. Block 202 may be followed by block 204.

In block 204, remote desktop client application 122 connects to the remote desktop of VM 106-*n* on remote server 102. Block 204 may be followed by block 206.

In block 206, remote desktop client application 122 receives screen data of the remote desktop of VM 106-*n* from the remote server. Remote desktop client application 122 displays remote desktop based on the screen data, which may compose the entire remote desktop. Due to the size and the resolution of the display on mobile client device 108-*n*, remote desktop client application 122 displays a portion of the remote desktop. Remote desktop client application 122 also displays a mode icon, direction icons, and a zoom icon.

Figure 3:
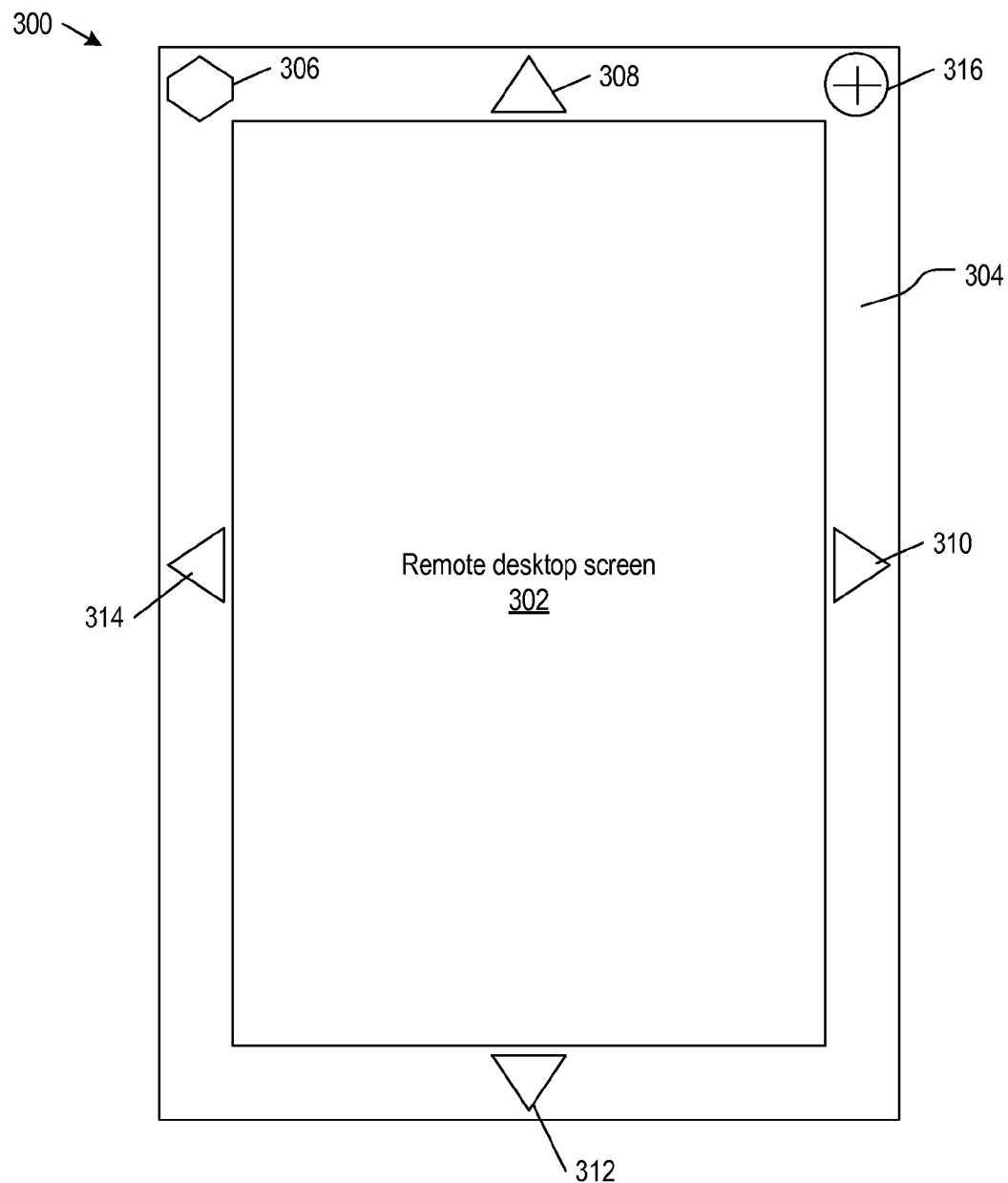
FIG. 3 shows a screen generated by the remote desktop client of FIG. 1 in examples of the present disclosure.

FIG. 3 shows a screen 300 generated by remote desktop client application 122 in examples of the present disclosure. Screen 300 includes a viewing area 302 displaying a portion of the remote desktop of VM 106-*n* and a border 304 around viewing area 302. A mode icon 306, direction icons 308, 310, 312, and 314, and zoom icon 316 are located in border 304. Mode icon 306 may be located at an upper left corner of border 304. Direction icons 308 to 314 may be arrows pointing to four different directions and each centered about one legs of border 304. Zoom icon 316 may be located at an upper right corner of border 304. For simplicity, zoom icon 316 may represent either a zoom in or a zoom out icon.

Referring back to FIG. 2, block 206 may be followed by block 208.

In block 208, remote desktop client application 122 receives coordinates of where the user is looking at from eye tracker 124 (FIG. 1). Block 208 may be followed by block 210.

In block 210, remote desktop client application 122 operates in a first (local) mode where direction icons 308 to 314 (FIG. 3) serve to locally scroll the remote desktop to display another portion of the remote desktop in viewing area 302 (FIG. 3). Block 210 may include sub-blocks 212, 214, 216, and 218.

In block 212, remote desktop client application 122 detects any selection of a direction icon 308, 310, 312, or 314 (FIG. 3) based on the user's eye movements. In one example, the user may select an icon by looking at the icon for greater than a threshold period of time. In another example, the user selects an icon by looking at the icon and blinking more than a threshold number of times. If a direction icon is being selected, remote desktop client application 122 locally scrolls the remote desktop in a corresponding direction to display another portion of the remote desktop in viewing area 302. The scroll may be continuous until the user looks away from the direction icon or the scroll may be incremented in fixed steps (such as a page up, down, left, or right).

Figure 5:
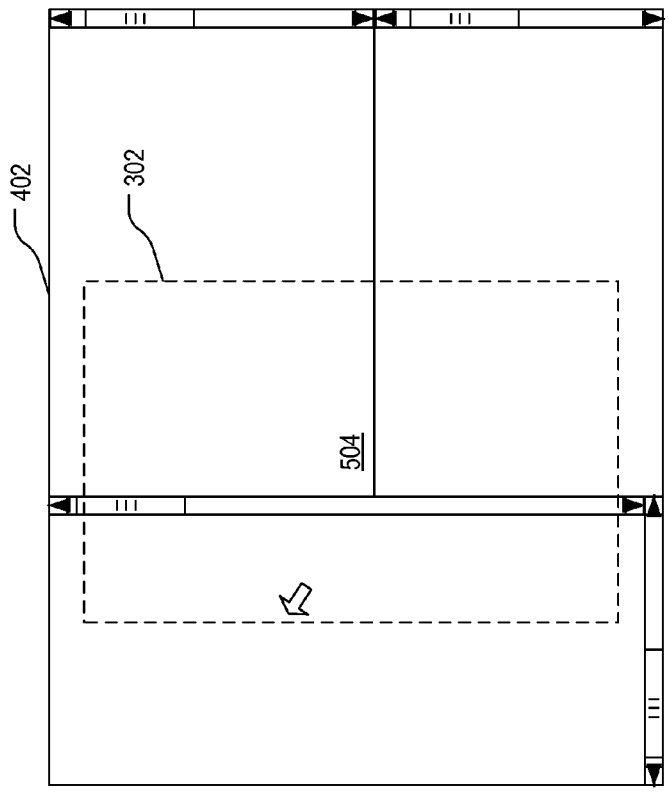
FIGS. 4 and 5 show local scrolling to display another portion of a remote desktop in examples of the present disclosure.
Figure 4:
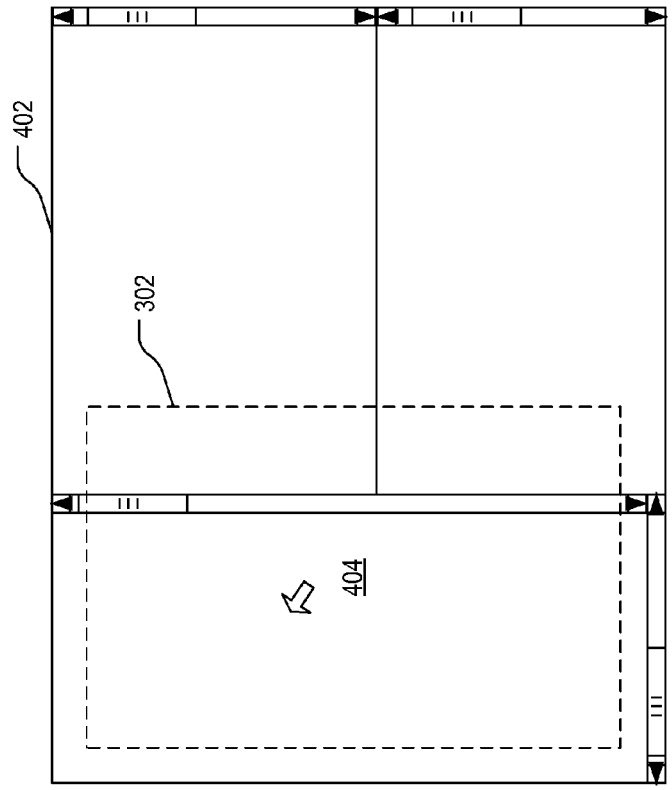

FIGS. 4 and 5 show the local scrolling of a remote desktop 402 in examples of the present disclosure. In FIG. 4, a portion 404 of remote desktop 402 is visible in viewing area 302. In FIG. 5, remote desktop client application 122 (FIG. 1) detects a right direction icon 310 (FIG. 3) being selected by the user's eye movements and locally scrolls remote desktop 402 to the left to show another portion 504 of the remote desktop 402 in viewing area 302.

Referring back to FIG. 2, block 212 may be followed by block 214.

In block 214, remote desktop client application 122 detects any selection of zoom icon 316 (FIG. 3) based on the user's eye movements. If zoom icon 316 is being selected, remote desktop client application 122 zooms in or out the remote desktop to display a magnified or shrunken portion of the remote desktop in viewable area 302. The magnified portion may be at 100% (actual size). Block 214 may be followed by block 216.

In block 216, remote desktop client application 122 detects any selection of an area of the remote desktop in viewing area 302 (FIG. 3) based on the user's eye movements. If an area of the remote desktop is being selected, remote desktop client application 122 zooms in to display a magnified portion of the remote desktop in viewable area 302. The magnified portion may be at 200% (actual size). Block 216 may be followed by block 218.

In block 218, remote desktop client application 122 detects any selection of mode icon 306 (FIG. 3) based on the user's eye movements. If mode icon 306 is being selected, remote desktop client application 122 switches from the first mode to a second mode, and block 218 may be followed by block 220. Otherwise remote desktop client application 122 continues to operate in the first mode as described above for block 210.

In block 220, remote desktop client application 122 operates in the second (remote) mode where direction icons 308 to 314 (FIG. 3) serve to remotely scroll in the remote desktop. In other words, selection of direction a direction icon is sent as a scrolling command to the remote desktop. The scrolling commands may be mouse wheel scrolling inputs that are used to scroll a window, a pane, or a menu on the remote desktop. Block 220 may include sub-blocks 222, 224, 226, 228, and 230.

In block 222, remote desktop client application 122 detects any selection of a direction icon 308, 310, 312, or 314 based on the user's eye movements. If a direction icon is being selected, remote desktop client application 122 sends a scrolling command in a corresponding direction to the remote desktop of VM 106-*n* (FIG. 1) on remote server 102. The scrolling command may be continuous until the user looks away from the direction icon or the scroll may be incremented in fixed steps (such as a page up, down, left, or right). VM 106-*n* receives the scrolling command and responds accordingly, and remote server 102 sends updated screen data back to client device 108-*n*. Block 212 may be followed by block 214.

In block 214, remote desktop client application 122 receives the updated screen data of the remote desktop and displays a portion of the remote desktop in viewing area 302 based on the updated screen data.

Figure 7:
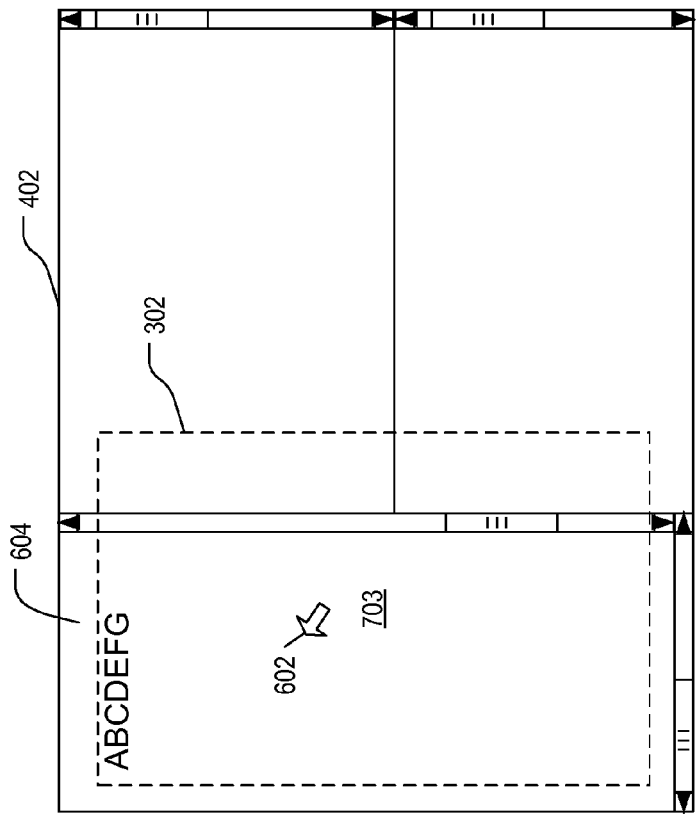
FIGS. 6 and 7 show remote scrolling in a remote desktop in examples of the present disclosure.
Figure 6:
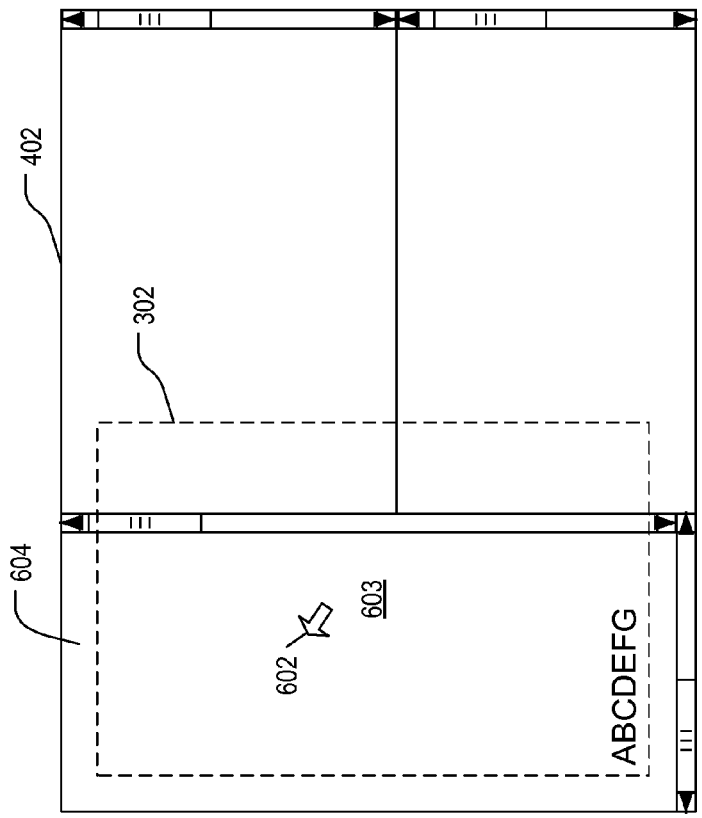

FIGS. 6 and 7 show the remote scrolling in remote desktop 402 in examples of the present disclosure. In FIG. 6, a cursor 602 of remote desktop 402 is located over a portion 603 of window pane 604 that is visible in viewing area 302 (FIG. 3) so any scrolling command is directed to window pane 604. Cursor 602 may be located over other graphical user interface elements so a scrolling command would to directed to that element. In FIG. 7, remote desktop client application 122 detects a down direction icon 312 (FIG. 3) being selected by the user's eye movements and sends a scrolling command in a corresponding direction to remote desktop 402 on VM 106-*n*. In response, window pane 602 is scrolled up to show another portion 703 of window pane 602, which is reflected in the updated screen data sent from remote server 102 to mobile client device 108-*n*. Remote desktop client application 122 displays the remote scrolling of window pane 602 in viewing area 302 based on the updated screen data.

Referring back to FIG. 2, block 224 may be followed by block 226.

In block 226, remote desktop client application 122 detects any selection of zoom icon 316 (FIG. 3) based on the user's eye movements. If zoom icon 316 is being selected, remote desktop client application 122 zooms in or out the remote desktop to display a magnified or shrunken portion of the remote desktop in viewable area 302. Block 226 may be followed by block 228.

In block 228, remote desktop client application 122 detects any selection of an area of the remote desktop in viewing area 302 (FIG. 3) based on the user's eye movements. If an area of the remote desktop is being selected, remote desktop client application 122 zooms in to display a magnified portion of the remote desktop in viewable area 302. Block 228 may be followed by block 230.

In block 230, remote desktop client application 122 detects any selection of mode icon 306 (FIG. 3) based on the user's eye movements. If mode icon 306 is being selected, remote desktop client application 122 switches from the second mode to the first mode, and block 230 may be followed by block 210. Otherwise remote desktop client application 122 continues to operate in the second mode as described above for block 220.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A method for a remote desktop client application to display a remote desktop located on a remote server based on a user's eye movements, the method comprising:
connecting to the remote desktop on the remote server;
receiving screen data of the remote desktop from the remote server;
displaying a portion of the remote desktop, a mode icon and direction icons, the portion of the remote desktop being based on the screen data;
operating in a first mode for the direction icons to locally scroll the remote desktop, comprising:
detecting one of the direction icons being selected based on the user's eye movements and, in response, locally scrolling the remote desktop to display another portion of the remote desktop; and
detecting the mode icon being selected based on the user's eye movements and, in response, switching from the first mode to a second mode for the direction icons; and
operating in the second mode to remotely scroll in the remote desktop, comprising:
detecting one of the direction icons being selected based on the user's eye movements and, in response, sending a scrolling command to the remote desktop on the remote server;
receiving updated screen data of the remote desktop from the remote server; and
displaying the other portion of the remote desktop based on the updated screen data.

2. The method of claim 1, further comprising:
displaying a zoom icon; and
detecting the zoom icon being selected based on the user's eye movements and, in response, zooming in or out of the remote desktop to display a magnified or shrunken portion of the remote desktop.

3. The method of claim 2, further comprising:
detecting the user's eyes selecting an area on the remote desktop and, in response, zooming in on the remote desktop to display another magnified portion of the remote desktop.

4. The method of claim 3, wherein an item from the mode icon, the zoom icon, the direction icons, and the area on the remote desktop is selected when the user's eyes look at the item greater than a threshold period of time.

5. The method of claim 3, wherein an item from the mode icon, the zoom icon, the direction icons, and the area on the remote desktop is selected when the user's eyes blink at the item greater than a threshold number of times.

6. The method of claim 3, wherein displaying further comprises displaying a border around the remote desktop, and the mode icon, the zoom icon, and the direction icons are located in the border.

7. The method of claim 6, wherein the direction icons are arrows pointing to different directions.

8. The method of claim 1, wherein the scrolling command comprises a mouse scroll wheel command.

9. A non-transitory computer-readable storage medium encoded with instructions executable by a processor on a client device to:
connect to a remote desktop on a remote server;
receive screen data of the remote desktop from the remote server;
display a portion of the remote desktop, a mode icon, and direction icons, the portion of the remote desktop being based on the screen data;
operate in a first mode for the direction icons to locally scroll the remote desktop, comprising:
detecting one of the direction icons being selected based on the user's eye movements and, in response, scrolling the remote desktop to display another portion of the remote desktop; and
detecting the mode icon being selected based on the user's eye movements and, in response, switching from the first mode to a second mode for the direction icons; and
operate in the second mode to remotely scroll in the remote desktop, comprising:
detecting one of the direction icons being selected based on the user's eye movements and, in response, sending a scrolling command to the remote desktop on the remote server;
receiving updated screen data of the remote desktop from the remote server; and
displaying the other portion of the remote desktop based on the updated screen data.

10. The non-transitory computer-readable storage medium of claim 9, wherein the instructions further include instructions executable by the processor to:
display a zoom icon; and
detect the zoom icon being selected based on the user's eye movements and, in response, zooming in or out of the remote desktop to display a magnified or shrunken portion of the remote desktop.

11. The non-transitory computer-readable storage medium of claim 10, wherein the instructions further include instructions executable by the processor to:
detect the user's eyes selecting an area on the remote desktop and, in response, zooming in on the remote desktop to display another magnified portion of the remote desktop.

12. The non-transitory computer-readable storage medium of claim 11, wherein an item from the mode icon, the zoom icon, the direction icons, and the area on the remote desktop is selected when the user's eyes look at the item greater than a threshold period of time.

13. The non-transitory computer-readable storage medium of claim 11, wherein an item from the mode icon, the zoom icon, the direction icons, and the area on the remote desktop is selected when the user's eyes blink at the item greater than a threshold number of times.

14. The non-transitory computer-readable storage medium of claim 11, wherein displaying further comprises displaying a border around the remote desktop, and the mode icon, the zoom icon, and the direction icons are located in the border.

15. The non-transitory computer-readable storage medium of claim 14, wherein the direction icons are arrows pointing to different directions.

16. The non-transitory computer-readable storage medium of claim 9, wherein the scrolling command comprises a mouse scroll wheel command.

17. A client device, comprising:
   a display screen;
   a camera to capture a user's eyes;
   a memory comprising instructions to track eye movements and to access a remote desktop on a remote server;
   a processor to execute the instructions in the memory to:
      track the eye movements to determine where the user is looking on the display screen;
      connect to the remote desktop on the remote server;
      receive screen data of the remote desktop from the remote server;
      display on the display screen a portion of the remote desktop, a mode icon, and direction icons, the portion of the remote desktop being based on the screen data;
      operate in a first mode for the direction icons to locally scroll the remote desktop, comprising:
         detecting one of the direction icons being selected based on the user's eye movements and, in response, scrolling the remote desktop to display another portion of the remote desktop; and
         detecting the mode icon being selected based on the user's eye movements and, in response, switching from the first mode to a second mode for the direction icons; and
      operate in the second mode to remotely scroll in the remote desktop, comprising:
         detecting one of the direction icons being selected based on the user's eye movements and, in response, sending a scrolling command to the remote desktop on the remote server;
         receiving updated screen data of the remote desktop from the remote server; and
         displaying on the display screen the other portion of the remote desktop based on the updated screen data.

18. The system of claim 17, wherein the processor further executes the instructions to:
   display a zoom icon; and
   detect the zoom icon being selected based on the user's eye movements and, in response, zooming in or out of the remote desktop to display a magnified or shrunken portion of the remote desktop.

19. The system of claim 18, wherein the processor further executes the instructions to:
   detect the user's eyes selecting an area on the remote desktop and, in response, zooming in on the remote desktop to display another magnified portion of the remote desktop.

20. The system of claim 17, wherein the scrolling command comprises a mouse scroll wheel command.

\* \* \* \* \*